(12) United States Patent
Edvardsson

(10) Patent No.: US 8,823,397 B2
(45) Date of Patent: Sep. 2, 2014

(54) INTERFACE DETECTION

(71) Applicant: Rosemount Tank Radar AB, Gothenburg (SE)

(72) Inventor: Olov Edvardsson, Linkoping (SE)

(73) Assignee: Rosemount Tank Radar AB, Gothenburg (SE)

( * ) Notice: Subject to any disclaimer, the term of this patent is extended or adjusted under 35 U.S.C. 154(b) by 154 days.

(21) Appl. No.: 13/628,484

(22) Filed: Sep. 27, 2012

(65) Prior Publication Data

US 2014/0084945 A1    Mar. 27, 2014

(51) Int. Cl.
*G01R 27/26* (2006.01)

(52) U.S. Cl.
USPC ........................................ 324/664

(58) Field of Classification Search
USPC .......... 324/644, 762.01–762.1, 662; 342/124, 342/118
See application file for complete search history.

(56) References Cited

U.S. PATENT DOCUMENTS

| | | | |
|---|---|---|---|
| 6,184,818 B1 * | 2/2001 | Meinel | 342/124 |
| 7,088,285 B2 * | 8/2006 | Smith | 342/124 |
| 7,525,476 B1 | 4/2009 | Delin et al. | |
| 2010/0313654 A1 | 12/2010 | Malinovskiy et al. | |

FOREIGN PATENT DOCUMENTS

| | | |
|---|---|---|
| GB | 2358535 A | 7/2001 |
| JP | 2000241232 A | 9/2000 |

* cited by examiner

*Primary Examiner* — Tung X Nguyen
(74) *Attorney, Agent, or Firm* — Westman, Champlin & Koehler, P.A.

(57) ABSTRACT

The invention relates to a method for determining a level of a material interface in a tank, by means of a radar level gauge system comprising a transceiver; a probe for guiding a transmitted electromagnetic signal towards the material interface. The probe comprises a first plurality of reference impedance transitions located above the interface at known physical distances from a reference position, and a second plurality of reference impedance transitions located below the interface at known physical distances from the reference position. The method comprising determining electrical distances to the first and second plurality of reference impedance transitions based on a signal reflected by the reference impedance transition, determining, a first and a second approximation function relating the first and second sets of electrical distance values to the physical distances; and determining the level of the material interface based on the first approximation function and the second approximation function.

15 Claims, 3 Drawing Sheets

INTERFACE DETECTION

FIELD OF THE INVENTION

The present invention relates to a method for determining a position of an interface in a product contained in a tank by means of a radar level gauge system.

TECHNICAL BACKGROUND

Radar level gauge systems are in wide use for measuring process variables of a product contained in a tank, such as filling level, temperature, pressure etc. Radar level gauging is generally performed either by means of non-contact measurement, whereby electromagnetic signals are radiated towards the product contained in the tank, or by means of contact measurement, often referred to as guided wave radar (GWR), whereby electromagnetic signals are guided towards and into the product by a probe acting as a waveguide. The probe is generally arranged vertically from top to bottom of the tank. The electromagnetic signals are subsequently reflected at the surface of the product, and the reflected signals are received by a receiver or transceiver comprised in the radar level gauge system. Based on the transmitted and reflected signals, the distance to the surface of the product can be determined.

In many applications, it is also desirable to be able to determine the position of one or more interfaces between different materials in a tank in order to accurately determine the distribution of material in a tank.

GWR systems have found a widespread use for the measurement of interfaces between different materials contained in a tank, such as for example the interface between oil and water.

An abrupt interface between two materials having different dielectric constants causes a portion of an electromagnetic signal propagating along a probe to be reflected, thereby the position of the interface can be determined based on the time of flight of the reflected signal and the propagation properties of the probe.

However, for some material combinations or environmental conditions, the interface may comprise an emulsion of or a mixture between materials, thereby resulting in an extended interface instead of an abrupt. An extended interface may also be seen as a diffuse interface or a transition zone.

An extended interface may lead to an unpredictable reduction of amplitude of the reflected signal as it propagates through the interface. Depending on the thickness of the upper layer, the signal resulting from a reflection at an interface may be further reduced as a result of dielectric losses induced in the transmission line by the upper layer. Consequently, a diffuse interface may result in a reflected signal which is reduced in amplitude or otherwise distorted to the extent that it is no longer possible to detect the interface.

Furthermore, even if a detectable reflected signal is received, there may be an uncertainty in determining the position of a diffuse interface as it is not known where in the extended interface the electromagnetic signal is reflected.

US2010/0313654 discloses a method for determining the position of an extended interface between two products in a tank by using a combination of a travel time measurement for an electromagnetic signal reflected at the interface and a capacitance measured between a capacitive probe and reference electrode.

However, the method according to US2010/0313654 requires that the interface is sufficiently well defined such that a detectable reflection of the electromagnetic signal occurs. Furthermore, as a second measurement involving capacitance measurement is required, system complexity is increased.

SUMMARY OF THE INVENTION

In view of the above-mentioned, a general object of the present invention is to provide an improved method and system for determining the position of an interface in a product contained in a tank.

According to a first aspect of the present invention, there is provided a method for determining a level of a material interface in a tank, by means of a radar level gauge system comprising: a transceiver for generating, transmitting and receiving electromagnetic signals; a probe connected to the transceiver and arranged to guide a transmitted electromagnetic signal from the transceiver towards the material interface, the probe comprising a first plurality of reference impedance transitions each located above the material interface at a respective physical distance from a reference position, and a second plurality of reference impedance transitions each located below the material interface at a respective physical distance from the reference position; the method comprising the steps of: determining, for each of the first plurality of reference impedance transitions, a value indicative of an electrical distance along the probe from the reference position to the reference impedance transition based on a received electromagnetic signal reflected by the reference impedance transition, resulting in a first set of electrical distance values; determining, for each of the second plurality of reference impedance transitions, a value indicative of an electrical distance along the probe from the reference position to the reference impedance transition based on a received electromagnetic signal reflected by the reference impedance transition, resulting in a second set of electrical distance values; determining, for the first plurality of reference impedance transitions, a first approximation function relating the first set of electrical distance values to the physical distances; determining, for the second plurality of reference impedance transitions, a second approximation function relating the second set of electrical distance values to the physical distances; determining the level of the material interface based on the first approximation function and the second approximation function.

In the context of the present application, the "probe" is a waveguide designed for guiding electromagnetic signals. Several types of probes, for example single-line (Goubau-type), and twin-line probes may be used. The probes may be essentially rigid or flexible and they may be made from metal, such as stainless steel, plastic, such as PTFE, or a combination thereof.

The "transceiver" may be one functional unit capable of transmitting and receiving electromagnetic signals, or may be a system comprising separate transmitter and receiver units.

The tank may be any container or vessel capable of containing a product, and may be metallic, or partly or completely non-metallic, open, semi-open, or closed.

That the position of each of the reference impedance transitions is "known" means that the position has been previously determined by means of any suitable measurement technique. For example, the position may be determined based on received electromagnetic signals reflected by the respective reference impedance transitions, but under controlled conditions, such as during production of the radar level gauge system or when the system is installed but the probe is clean and the tank empty. In many cases, the mechanical position of the reflectors is accurately known from production.

The material interface should be understood as the interface between two materials having different dielectric constants. Furthermore, the two materials may be in different phases such that the interface defines a transition between a liquid and a gas. Additionally, the interface must not be abrupt, the interface may instead be defined by an extended transition region defining the transition from one material to another. For example, if an emulsion of two liquids forms the interface, the interface would be extended and the material composition of the interface would most likely be described as a gradual transition between the two materials. Such an extended interface may also be regarded as a diffuse interface, where the boundaries and exact extension of the interface is unclear.

The present invention is based on the realization that it is possible to determine the position of an extended or diffuse interface in a radar level gauge system, even if an electromagnetic signal reaching the interface is not reflected, by using a probe having reference impedance transitions located at known positions along the probe. Thereby, in addition to the normal measurement of the filling level of the product in the tank, it is provided an indirect method where the position of a plurality of fixed reflectors are measured accurately and used to calculate the positions of the possibly diffuse and non-reflective interfaces. An electromagnetic signal is propagated along the probe where each reference impedance transition causes a portion of the signal to be reflected back towards the transceiver, such that the electrical distance to the impedance transitions can be determined. By approximating an analytical function relating the measured electrical distances to the impedance transitions to the known physical distances, for groups of impedance transitions at respective sides of the interface, the approximated analytical functions gives an approximation of the position of the interface by identifying where a transition take place from the first approximation function to the second approximation function. The resolution is based on the number and distribution of reference impedance transitions along the probe. Accordingly, the distribution of impedance transitions may be configured to be suitable for a particular application or for specific measurement conditions.

A further advantage of the present invention is that it is not required to know the properties, such as the dielectric constant, of the materials on either side of the interface. On the contrary, the propagation properties of the materials may also be determined by the method according to embodiments of the present invention. Furthermore, more than one interface may be detected.

The space between the tank roof and the uppermost surface of the product in the tank is generally filled with some kind of atmosphere which generally has a dielectric constant close to 1. Some liquids with strong evaporation, gases under pressure or water vapor at high temperature and pressure may have a dielectric constant clearly different from 1. Some applications may include liquid over the full tank dept but with an interface which is to be measured. Obviously, the method according to various embodiments of the invention would automatically adapt to such conditions even if the surface would be difficult to measure directly due to boiling, foam etc.

According to one embodiment of the invention, each of the first approximation function and the second approximation function is determined based on the relation between the electrical distance values and the physical distances for at least three reference impedance transitions. By increasing the number of reflected signals from reference impedance transitions used for determining the approximation functions, the accuracy in the determination of the approximation function can be improved, thereby improving the accuracy of the determination of the level of the interface.

In one embodiment of the invention, the step of determining the level of the material interface further comprises determining a physical distance from the reference position for which the first approximation function and the second approximation function have approximately the same function value; and determining the level of the material interface based on the determined physical distance. That the two functions have the same function value (i.e. y-value in an x-y coordinate system) means that the two functions intersect in a graphic representation of the functions in an x-y coordinate system. Thereby, the approximate position of the interface can be determined as the function value for the intersection point between the two approximation functions.

According to one embodiment, the first approximation function and the second approximation function may advantageously be linear functions. Using linear functions as approximation functions means that well known linear curve fitting and linear regression methods can be used to fit and evaluate a linear function relating the measured electrical distances to the known physical distances.

In one embodiment of the invention, the method may further comprise the steps of determining a dielectric constant of the material above the material interface based on a slope of the first approximation function and determining a dielectric constant of the material below the material interface based on a slope of the second approximation function.

For example, for a linear function representing the relation between the detected electrical distance and the known physical distance, and assuming that the dielectric constant is essentially constant throughout the material, the slope of the linear function is related to the propagation velocity of the electromagnetic wave, which in turn is related to the dielectric constant of the material in which the wave travels. Thereby, the dielectric constant of the materials can be determined based on the slope of the approximation functions.

According to one embodiment of the invention, the method may further comprise determining an extension of the interface by comparing a distance distribution of reference impedance transitions based on the received electromagnetic signals reflected by the reference impedance transitions with a known distance distribution of the reference impedance transitions. For example, if the number of detected reference impedance transitions does not correspond to the known number of reference impedance transitions, the reason may be that reference impedance transitions are located within a diffuse interface thereby resulting in no reflection or in a reflected signal which is undetectable. By observing when determining the level of the material interface that two or more "missing" reference impedance transitions are located in an interface between two materials, it can be concluded that the extension of the interface at least corresponds to the distance between the two or more undetected reference impedance transitions. Furthermore, even if reflected signals are detected, they may be excluded from the determination of the approximation function due to low correlation as will be discussed in further detail below. If such excluded reflections are located next to an identified position of an interface, the excluded point may be considered to belong to a diffuse interface, thereby making it possible to estimate the extension of a diffuse interface.

In one embodiment of the invention the method may further comprise the step of evaluating, for at least one of the first approximation function and the second approximation function, a correlation value indicative of a correlation between the approximation function and the electrical distance values for the first plurality and the second plurality of reference impedance transitions, respectively; and if the correlation value is below a predetermined threshold value, determine a new approximation function based on a respective selected subset of the first or the second plurality of reference impedance transitions. Provided that an approximation function has been determined, the correlation between the specific points representing the relation between the electrical distance and the physical distance to the reference impedance transitions and the approximation function can also be determined. If the correlation is below a predetermined threshold value, i.e. if the deviation for a point exceeds a certain predetermined threshold value, the point may be discarded and a new approximation function can be determined based on the new subset of points corresponding to a subset of reference impedance transitions excluding the reference impedance transition corresponding to the point having low correlation. Thereby, received reflections that for some reason appear to be erroneous may be excluded from the determination of the approximation function, thus providing a more reliable approximation function.

According to a second aspect of the invention, there is provided a radar level gauge system for determining a level in a tank of a material interface between a first material having a first dielectric constant and a second material having a second dielectric constant, the radar level gauge system comprising: a transceiver for generating, transmitting and receiving electromagnetic signals; a probe connected to the transceiver and arranged to guide a transmitted electromagnetic signal from the transceiver through the first material and into the second material, the probe comprising: a first plurality of reference impedance transitions arranged along the probe in the first material; and a second plurality of reference impedance transitions arranged along the probe in the second material; and processing circuitry connected to the transceiver and configured to determine a position of the interface based on received electromagnetic signals reflected by the first plurality and the second plurality of reference impedance transitions.

According to an embodiment of the invention, the reference impedance transitions may be reference reflectors arranged along the probe. Each reference impedance transition can be a reflector which may be implemented as a structure capable of reflecting electromagnetic signals traveling along the probe and may be achieved by means of a structure external to the probe, an internal structure in the probe, or a combination thereof. Furthermore, different reference reflectors may be provided as identical or different reflecting structures.

In one embodiment of the invention, the reference impedance transitions may advantageously be irregularly arranged along the probe. The reference impedance transitions may advantageously be arranged along the probe such that accumulated disturbance resulting from positive interference of reflections of the electromagnetic signal at the reference impedance transitions is reduced. If several reference reflectors are periodically arranged along the probe, a small portion of the transmitted reflected signals may "bounce" back and forth between different reflectors such that the accumulated reflection resulting from positive interference eventually may be mistaken for an original reflection from a reference reflector. Especially in the case of a relatively long probe, such as a probe longer than for example 15-20 m, it may be advantageous to arrange the reference reflectors to be irregularly spaced along the probe so as to avoid interference effects. An irregular arrangements further aims to avoid that the position of the reflectors forms a periodic structure which close to certain frequencies (typically when the common distance is an integer number of half wavelengths) have very different reflection and propagation as compared to other frequencies. When the radar is operating in a fairly limited bandwidth a sufficient distance spread is $\pm\lambda/4$ of the used frequency. If the probe is rather short the need for irregular interval is less. Most radar level gauges use a bandwidth in the order of 1 GHz and in that case a nominal reflector interval of 0.4 m may be suitable which gives 10-20 reflectors in a typical tank. Preferable reflecting impedances with a rather weak reflex are preferred to decrease problems with multiple reflections and excessive power loss due to many reflections. Various types of signal processing and a wide bandwidth may of course simplify the use of many reflectors. Within this principle a wide range of tank depths and reflector spacing should be possible.

According to one embodiment of the invention, the reference impedance transitions may be arranged at pseudo-random positions along said probe in order to reduce the likelihood of undesirable reflections as discussed above.

In one embodiment of the invention, the radar level gauge system may further comprise a dielectric structure enclosing at least a majority of the length of the probe, the dielectric structure being configured to reduce the attenuation of an electromagnetic signal propagating along the probe. A dielectric structure reducing the attenuation of the signal propagating along the probe facilitates using a longer probe or measuring under conditions where damping of the signal would otherwise be a problem. Hereby, accurate measurements are rendered possible even in cases where the transmission line probe extends through a dielectric environment, and where a level to be measured is situated below a layer of dielectric material. The expression "enclosing at least a majority of the length of the probe" is understood to mean that a major part of the area of the active part of probe is enclosed. Preferably the part of the probe that is inserted in the tank is essentially completely enclosed, or at least that part of the probe that is to be in contact with the content contained in the tank. Preferably, the active part of the probe is also substantially or completely enclosed in an axial direction. In addition, the dielectric enclosing structure also provides a protective shield for the probe, and thereby protects the probe from corrosion and the like caused by the content in the tank. In one embodiment, the probe is a transmission line probe comprising parallel probe lines, wherein at least a substantial part of the parallel probe lines are enclosed by the dielectric enclosing structure. Using a probe having a dielectric structure is particularly advantageous for measuring oil on top of water, as a signal which is transmitted along a probe without a dielectric structure is rapidly damped by the water, thereby making it more difficult to identify reference impedance transitions located in the water. The reflectors should preferably be enclosed inside the dielectric enclosure to give a measurable reflection both when the surrounding material is water, oil or atmosphere.

In one embodiment of the invention the processing circuitry may further be configured to determine, for each of the first plurality of reference impedance transitions, a value indicative of an electrical distance along the probe from the reference position to the reference impedance transition based on a received electromagnetic signal reflected by the reference impedance transition, resulting in a first set of electrical distance values; determine, for each of the second plurality of reference impedance transitions, a value indicative of an electrical distance along the probe from the reference position to the reference impedance transition based on a received electromagnetic signal reflected by the reference impedance transition, resulting in a second set of electrical distance values; determine, for the first plurality of reference impedance transitions, a first approximation function relating the first set of electrical distance values to the physical distances; determine, for the second plurality of reference impedance transitions, a second approximation function relating the second set of electrical distance values to the physical distances; determine the level of the material interlace based on the first approximation function and the second approximation function.

The processing circuitry may further be configured to: determine a physical distance from the reference position for which the first approximation function and the second approximation function have approximately the same function value; and determine the level of the material interface based on the determined physical distance.

Furthermore, the processing circuitry may be configured to determine a dielectric constant of the first material above the material interface based on a slope of the first approximation function; and determine a dielectric constant of the second material below the material interface based on a slope of the second approximation function.

Further effects and features of this second aspect of the present invention are largely analogous to those described above in connection with the first aspect of the invention.

BRIEF DESCRIPTION OF THE DRAWINGS

These and other aspects of the present invention will now be described in more detail, with reference to the appended drawings showing an exemplary embodiment of the invention, wherein:

FIG. 1b is a block diagram of the radar module shown in FIG. 1a;

DETAILED DESCRIPTION EXAMPLE EMBODIMENTS OF THE INVENTION

In the present detailed description, various embodiments of the method and the radar level gauge system for determining the level of an interface according to the present invention are mainly discussed with reference to a radar level gauge system having a twin line probe comprising a plurality of reference reflectors.

Figure 1A:
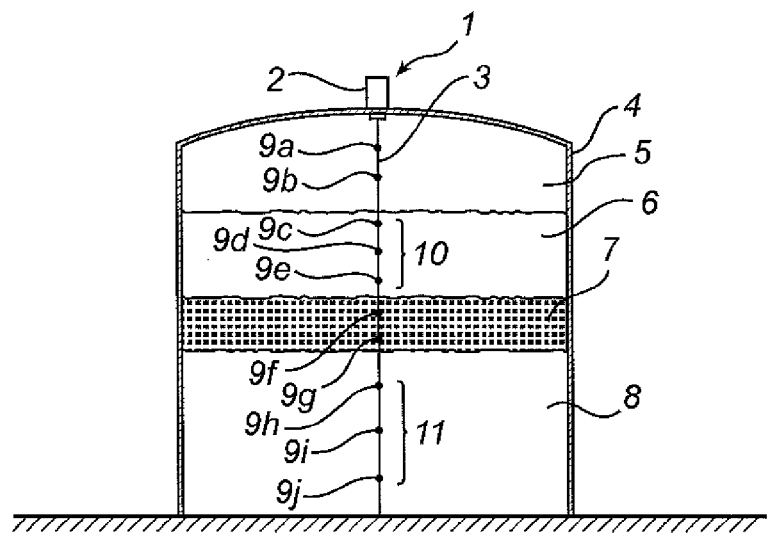
FIG. 1a is a schematic illustration of a radar level gauge system according to an embodiment of the invention.

FIG. 1a schematically illustrates a radar level gauge system 1 according to an embodiment of the present invention, comprising a measurement electronics unit 2, and a probe 3 having a plurality of reference reflectors 9a-j. The radar level gauge system 1 is provided on a tank 4, which is partly filled with a product to be gauged. The tank contains a tank atmosphere 5, a first material 6, a second material 8 and an interface 7 between the two materials. By analyzing transmitted signals being guided by the probe 3 into the first material 6, through the material interface 7 and into the second material 8, the measurement electronics unit 2 can determine the distance between a reference position (such as the tank ceiling) and the respective reference reflectors, whereby the level of the material interface can be deduced.

Figure 1B:
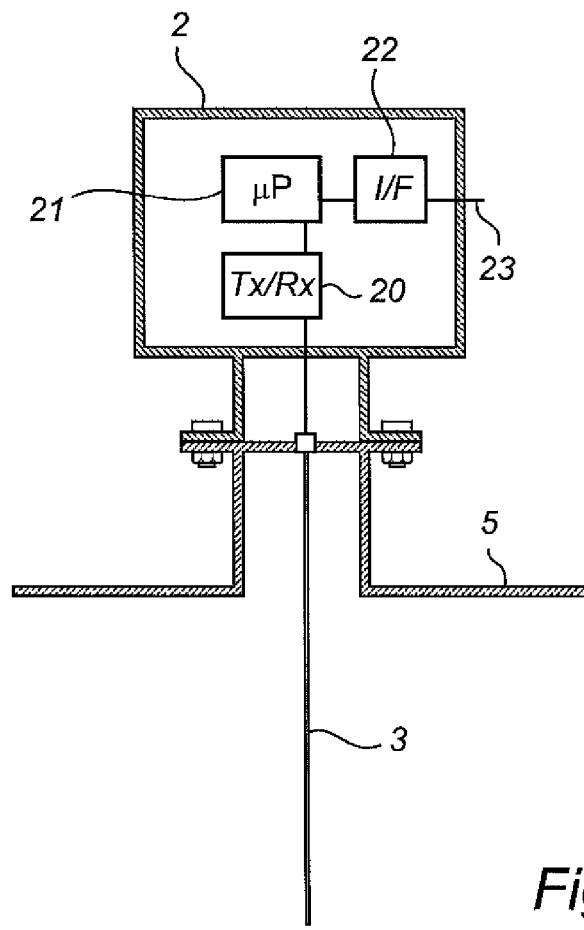

As is schematically illustrated in FIG. 1b, the electronics unit 2 comprises a transceiver 20 for transmitting and receiving electromagnetic signals, a processing unit 21, which is connected to the transceiver 20 for control of the transceiver and processing of signals received by the transceiver to determine the level of the material interface 7 in the tank 4. The processing unit 21 is, furthermore, connectable to external communication lines 23 for analog and/or digital communication via an interface 22. Moreover, although not shown in FIG. 1b, the radar level gauge system 1 is typically connectable to an external power source, or may be powered through the external communication lines 23. Alternatively, the radar level gauge system 1 may be configured to communicate wirelessly.

FIGS. 2a-d schematically illustrate exemplary reference reflectors.

Figures 2A, 2B, 2C, 2D:
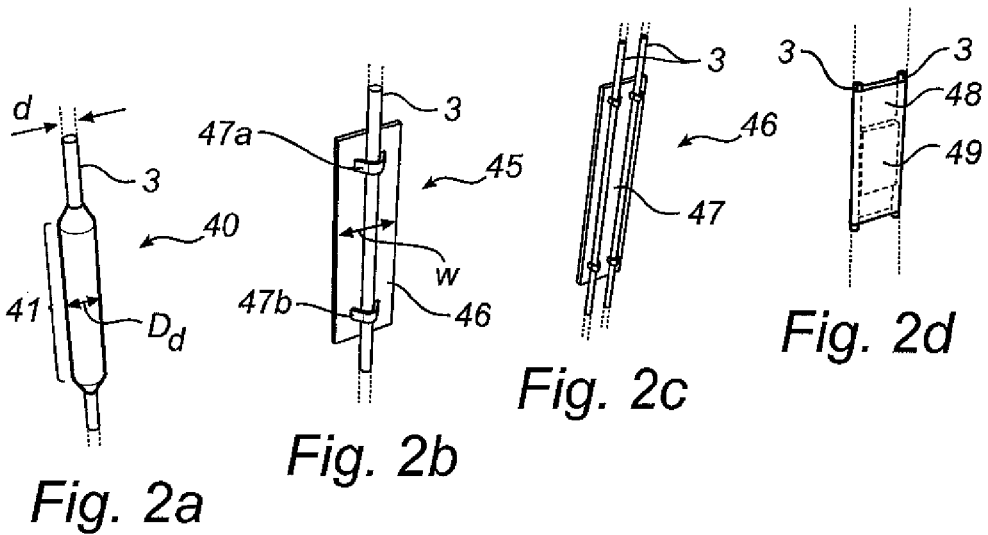
FIGS. 2a to 2d schematically illustrate various exemplary reference reflectors for use in various embodiments of the radar level gauge system according to the present invention.

According to a first alternative embodiment schematically illustrated in FIG. 2a, the reference reflector 40 may be provided in the form of a dielectric body. This dielectric reference reflector 40 may for example be made of PTFE or another suitable dielectric material or combination of materials. Furthermore, the dielectric body may be provided as an integral part adhering to the probe 3 to avoid spaces that might otherwise be infiltrated by the material in the tank 5. For example, the dielectric body can be molded around the probe 3, or the dielectric body can be provided as separated parts, which are then melted and allowed to harden at the desired location along the probe 3.

According to a second alternative embodiment schematically illustrated in FIG. 2b, the reference reflector 45 may be provided in the form of a metallic plate 46 that is attached to the probe by holders 47a-b. Such a metallic plate 46 locally makes the probe 3 thicker in an electrical sense. That is, the impedance of the probe 3 is lower where the plate 46 is. Compared to the reference reflector illustrated in FIG. 2a, the reference reflector 45 in FIG. 2b is simpler to manufacture and attach but is more sensitive to contamination by the product in the tank.

In FIG. 2c, a third alternative embodiment of a reference reflector 47 is schematically illustrated, according to which a metal plate 48 is attached to a two-wire probe 3. Additionally, the reference impedance transition may also be integrated in the probe, for example in the form of a transition between materials having different propagation properties.

FIG. 2d schematically illustrates a fourth alternative embodiment of a reference reflector 49, wherein a metal plate 49 is arranged between the two wires of a two-wire probe. The reference reflector 49 and the two-wire probe 3 is further enclosed by a dielectric sleeve 48 acting to reduce attenuation of a signal propagating along the probe. The dielectric sleeve 48 encloses and extends along the full length of the probe 3. If the distance between the two wires of the probe 3 is 15-30 mm, the dielectric sleeve 48 may have a thickness of up to a few mm. The desired thickness of the sleeve 48 is a tradeoff between the requirement for reducing the attenuation from lossy liquids like water (less attenuation with a thick sleeve) and requirements to have clear influence of the surrounding liquid (higher influence with thin sleeve).

The reference reflectors are assumed to be slightly irregularly arranged in order to avoid disturbance from accumulation of small portions of reflected signals. However, the positions of the reference reflectors illustrated in FIG. 1a are merely illustrative.

The lower end of the probe, which may be the bottom of the tank, may also be usable as a known reflective point and used for calculations.

Figure 3:
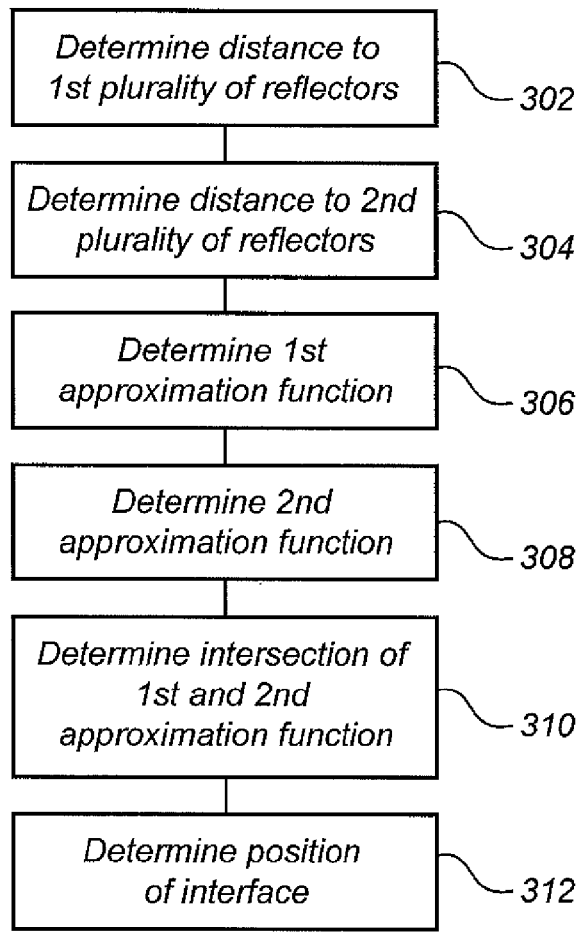
FIG. 3 is a flow chart outlining the method according to an embodiment of the invention.
Figure 4A:
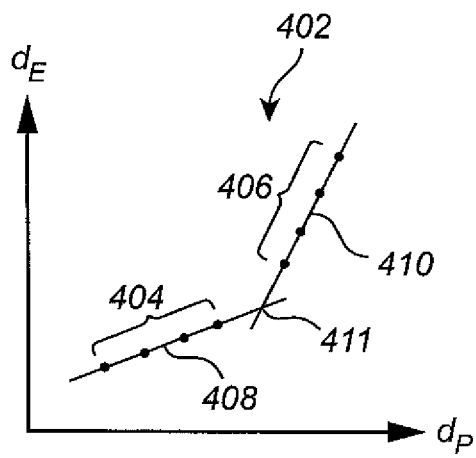
FIGS. 4a to 4c schematically illustrate graphs illustrating the determination of the level of an interface according to various embodiment of the invention.

FIG. 3 is a block diagram outlining the general steps of determining the level of an interface according to an embodiment of the invention. The method will be described with reference to the radar level gauge system of FIGS. 1a and 1b and to the diagram of FIG. 4a illustrating the relation between the electrical distance $d_E$ and the physical distance $d_P$ from a reference position to the reference reflectors. In the present example, the first material 6 is oil and the second material 8 is water, and the extended interface 7 is an emulsion comprising oil and water, thereby appearing as a diffuse (i.e. non-abrupt) interface. The probe 3 is assumed to be a twin line transmission line probe having a dielectric disclosure for reducing damping from the medium surrounding the probe, and in particular for facilitating the signal penetration into water.

Figure 4B:
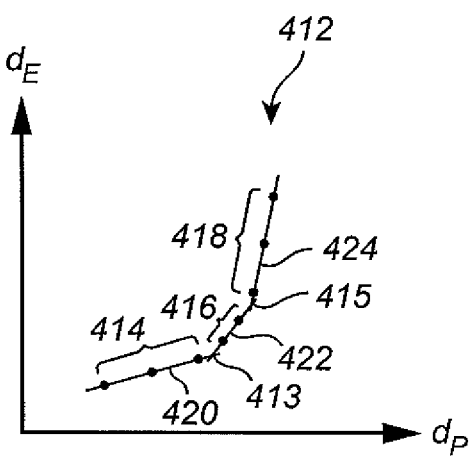
Figure 4C:
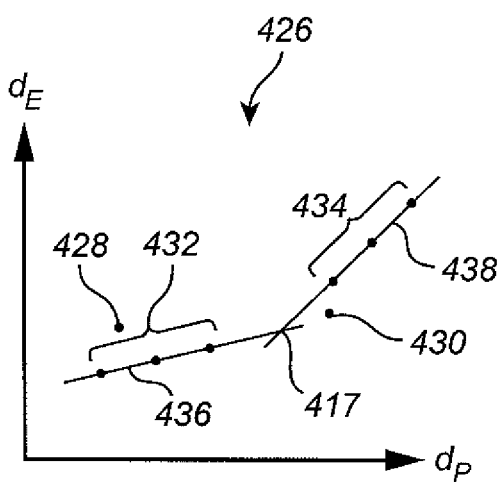

It should furthermore be noted that the diagrams in FIGS. 4a to 4c are not drawn to scale and that they merely serve to illustrate the general principle of the present invention. Each point in the diagrams correspond to one of the reference reflectors and the position of the point represents the relation between the electrical distance $d_E$ and the physical distance $d_P$ from a reference position preferably located at or near the ceiling of the tank. The difference in slopes between different linear relations may be exaggerated for illustrative purposes.

In a first step 302, the electrical distances to a first plurality of reflectors 10 is determined and represented by the first plurality of points 404 illustrated in the graph 402.

In the next step 304, the electrical distances to a second plurality of reflectors 11 is determined and illustrated by the second plurality of points 406.

After that, a first approximation function 408 is determined 306 corresponding to the first plurality of points 404 and a second approximation function 410 is determined 308 corresponding to the second plurality of points 408. The approximation functions 408 and 410 are here illustrated as straight lines and the approximation can be achieved by performing linear curve fitting according to any method well known by the person skilled in the art.

It should be noted that the slope of the lines in most cases are fairly well known either from stored start information or after a time of measurement on the same tank content. The lowest layer is typically water and will give a propagation velocity mainly dependent of the material in the probe, the oil has a dielectric constant just over 2 and the atmosphere generally has a dielectric constant very close to 1. When this knowledge holds (or is supported by earlier measurements of the same tank content) the inclination of the lines in FIGS. 4a-c is known and therefore do not need so many points to draw the at least partly linear curve.

After determining the first and second approximation functions 408, 410, the physical distance corresponding to the intersection between the two functions is determined 310 and the position of the interface is determined 312 as the physical distance from a reference position to the point where the functions intersect 411. Thereby, as the distance from the reference position to the bottom of the tank is known, the level of the material interface with reference to the bottom of the tank can be determined. An advantage of the method described above is that the level of the interface can be determined without receiving any reflected signal from the actual interface.

Furthermore, if it is determined that two or more undetected reference reflectors are located at positions between the first plurality of points 404 and the second plurality of points 406, an extension of the diffuse interface can be estimated based on the known physical distance between the two or more undetected reference reflectors.

Graph 412 of FIG. 4b schematically illustrates an example where three materials having different dielectric constants are present in the tank 4. The first plurality of points 414 may correspond to the atmosphere 5 in the tank 4, the second plurality of points 416 may correspond to oil and the third plurality of points 418 may correspond to water. Accordingly, three approximation functions, 420, 422 and 424 are determined and levels of the two separate material interfaces can be determined. The interface between the atmosphere 5 and oil is represented by the intersection 413 and the interface between oil and water by the intersection 415.

FIG. 4c illustrates an example where measured points 428 and 430 have been excluded from the determination of the approximation functions 436 and 438 in order to achieve a higher correlation between the approximation functions and the selected subset of points 432 and 434, respectively. For example, using least squares fitting for determining the approximation functions, the correlation coefficient may be used as a measure on the quality of the fit in order to determine if is sufficiently good or if any point should be excluded from the plurality of points to which the function is fitted in order to achieve an approximation function having a better fit. Thereby the position of the interface can be accurately determined based on the intersection 417 of the first and second approximation functions 436, 438 even if some measured points are erroneous.

The dielectric constant of the different materials may be determined from the slope of the approximation functions. As the slope of the linear function will be determined by the propagation velocity of the signal in the different materials, the known relation between the propagation velocity and the dielectric constant of the surrounding material can be determined.

Even though the invention has been described with reference to specific exemplifying embodiments thereof, many different alterations, modifications and the like will become apparent for those skilled in the art. For example, the determination of the approximation function may be performed in any number of ways based on general knowledge of curve fitting. Furthermore, conventional filling level detection based on the reflection of a signal at a surface of a product can be used in combination with the present invention. Also, it should be noted that parts of the system may be omitted, interchanged or arranged in various ways, the radar level gauge system yet being able to perform the functionality of the present invention.

What is claimed is:

1. A method for determining a level of a material interface in a tank, by means of a radar level gauge system comprising:
   a transceiver for generating, transmitting and receiving electromagnetic signals;
   a probe connected to said transceiver and arranged to guide a transmitted electromagnetic signal from said transceiver towards said material interface, said probe comprising a first plurality of reference impedance transitions each located above said material interface at a respective physical distance from a reference position, and a second plurality of reference impedance transitions each located below said material interface at a respective physical distance from said reference position;
   said method comprising the steps of:
   determining, for each of said first plurality of reference impedance transitions, a value indicative of an electrical distance along said probe from said reference position to said reference impedance transition based on a received electromagnetic signal reflected by said reference impedance transition, resulting in a first set of electrical distance values;

determining, for each of said second plurality of reference impedance transitions, a value indicative of an electrical distance along said probe from said reference position to said reference impedance transition based on a received electromagnetic signal reflected by said reference impedance transition, resulting in a second set of electrical distance values;

determining, for said first plurality of reference impedance transitions, a first approximation function relating said first set of electrical distance values to said physical distances;

determining, for said second plurality of reference impedance transitions, a second approximation function relating said second set of electrical distance values to said physical distances;

determining said level of said material interface based on said first approximation function and said second approximation function.

2. The method according to claim 1, wherein each of said first approximation function and said second approximation function is determined based on the relation between said electrical distance values and said physical distances for at least three reference impedance transitions.

3. The method according to claim 1, wherein the step of determining said level of said material interface further comprises:

determining a physical distance from said reference position for which said first approximation function and said second approximation function have approximately the same function value; and determining said level of said material interface based on said determined physical distance.

4. The method according to claim 1, wherein said first approximation function and said second approximation function are linear functions.

5. The method according to claim 1, further comprising the steps of:

determining a dielectric constant of a material above said material interface based on a slope of said first approximation function; and determining a dielectric constant of a material below said material interface based on a slope of said second approximation function.

6. The method according to claim 1, further comprising the step of determining an extension of said interface by comparing a distance distribution of reference impedance transitions based on said received electromagnetic signals reflected by said reference impedance transitions with a known distance distribution of said reference impedance transitions.

7. The method according to claim 1, further comprising the step of:

evaluating, for at least one of said first approximation function and said second approximation function, a correlation value indicative of a correlation between said approximation function and said electrical distance values for said first plurality and said second plurality of reference impedance transitions, respectively; and if said correlation value is below a predetermined threshold value, determine a new approximation function based on a respective selected subset of said first or said second plurality of reference impedance transitions.

8. A radar level gauge system for determining a level in a tank of a material interface between a first material having a first dielectric constant and a second material having a second dielectric constant, said radar level gauge system comprising:

a transceiver for generating, transmitting and receiving electromagnetic signals;

a probe connected to said transceiver and arranged to guide a transmitted electromagnetic signal from said transceiver through said first material and into said second material, said probe comprising:

a first plurality of reference impedance transitions arranged along said probe in said first material; and a second plurality of reference impedance transitions arranged along said probe in said second material; and processing circuitry connected to said transceiver and configured to determine a position of said interface based on received electromagnetic signals reflected by said first plurality and said second plurality of reference impedance transitions.

9. The radar level gauge system according to claim 8, wherein said reference impedance transitions are reference reflectors arranged along said probe.

10. The radar level gauge system according to claim 8, wherein said reference impedance transitions are irregularly arranged along said probe.

11. The radar level gauge system according to claim 8, wherein said reference impedance transitions are arranged at pseudo-random positions along said probe.

12. The radar level gauge system according to claim 8, further comprising a dielectric structure enclosing at least a majority of the length of said probe, said dielectric structure being configured to reduce the attenuation of an electromagnetic signal propagating along said probe.

13. The radar level gauge system according to claim 8, wherein said processing circuitry is further configured to:

determine, for each of said first plurality of reference impedance transitions, a value indicative of an electrical distance along said probe from said reference position to said reference impedance transition based on a received electromagnetic signal reflected by said reference impedance transition, resulting in a first set of electrical distance values;

determine, for each of said second plurality of reference impedance transitions, a value indicative of an electrical distance along said probe from said reference position to said reference impedance transition based on a received electromagnetic signal reflected by said reference impedance transition, resulting in a second set of electrical distance values;

determine, for said first plurality of reference impedance transitions, a first approximation function relating said first set of electrical distance values to said physical distances;

determine, for said second plurality of reference impedance transitions, a second approximation function relating said second set of electrical distance values to said physical distances;

determine said level of said material interface based on said first approximation function and said second approximation function.

14. The radar level gauge system according to claim 13, wherein said processing circuitry is further configured to:

determine a physical distance from said reference position for which said first approximation function and said second approximation function have approximately the same function value; and determine said level of said material interface based on said determined physical distance.

15. The radar level gauge system according to claim 13, wherein said processing circuitry is further configured to:
- determine a dielectric constant of said material above said material interface based on a slope of said first approximation function; and
- determine a dielectric constant of said material below said material interface based on a slope of said second approximation function.

* * * * *